US008819827B1

(12) United States Patent
Easttom

(10) Patent No.: US 8,819,827 B1
(45) Date of Patent: Aug. 26, 2014

(54) METHOD AND APPARATUS OF PERFORMING DATA EXECUTABLE INTEGRITY VERIFICATION

(75) Inventor: William Charles Easttom, McKinney, TX (US)

(73) Assignee: Open Invention Network, LLC, Durham, NC (US)

( * ) Notice: Subject to any disclaimer, the term of this patent is extended or adjusted under 35 U.S.C. 154(b) by 35 days.

(21) Appl. No.: 13/293,934

(22) Filed: Nov. 10, 2011

Related U.S. Application Data

(60) Provisional application No. 61/412,236, filed on Nov. 10, 2010.

(51) Int. Cl.
*G08B 23/00* (2006.01)

(52) U.S. Cl.
USPC ................ 726/24; 726/22; 726/23; 713/150; 713/189

(58) Field of Classification Search
None
See application file for complete search history.

(56) References Cited

U.S. PATENT DOCUMENTS

| 5,956,481 | A | 9/1999 | Walsh et al. |
| 6,687,836 | B1 | 2/2004 | Butler |
| 7,603,614 | B2 | 10/2009 | Cohen et al. |
| 2010/0231557 | A1 | 8/2002 | Obrecht |
| 2004/0162989 | A1* | 8/2004 | Kirovski ...................... 713/189 |
| 2006/0101408 | A1* | 5/2006 | Kotamarthi et al. .......... 717/126 |
| 2006/0190996 | A1* | 8/2006 | Korkishko et al. ................. 726/9 |
| 2007/0209060 | A1* | 9/2007 | Rhodes ............................. 726/3 |
| 2008/0071617 | A1* | 3/2008 | Ware ............................... 705/14 |
| 2008/0092235 | A1* | 4/2008 | Comlekoglu ................... 726/22 |
| 2008/0267406 | A1* | 10/2008 | Asokan et al. ................. 380/277 |
| 2009/0287917 | A1* | 11/2009 | Carpenter et al. ................ 713/2 |
| 2010/0263051 | A1* | 10/2010 | Ngalle ............................ 726/26 |

OTHER PUBLICATIONS

Fiskiran, M., et al, "Runtime Execution Monitoring (REM) to Detect and Prevent Malicious Code Execution", ICCD, Oct. 2004, pp. 452-457, San Jose, CA.
David Lie, et al., "Architectural Support for Copy and Tamper Resistant Software", Stanford, 2002, http://www.stanford.edu/class/cs259/slides/08.xom.pdf.

* cited by examiner

*Primary Examiner* — Philip Chea
*Assistant Examiner* — Khoi Le
(74) *Attorney, Agent, or Firm* — Haynes and Boone, LLP

(57) ABSTRACT

Disclosed are an apparatus and method of verifying an application installation procedure. One example method of operation may include receiving an application at a computer device and initiating the installation of the application on the computer device. The method may also provide executing the application during the installation procedure and creating a hash value corresponding to the executed application data. The method may further provide storing the hash value in memory and comparing the hash value to a pre-stored hash value to determine whether to continue the installation of the application.

14 Claims, 6 Drawing Sheets

METHOD AND APPARATUS OF PERFORMING DATA EXECUTABLE INTEGRITY VERIFICATION

CROSS-REFERENCE TO RELATED APPLICATIONS

This application claims benefit to provisional application 61/412,236, entitled "Executable Integrity Verification", filed on Nov. 10, 2010, the entire contents of which are hereby incorporated by reference.

TECHNICAL FIELD OF THE INVENTION

This invention relates to a method and apparatus of ensuring data files and related applications are properly installed and verified for added security measures, and more particularly, to verifying the application contents for added data integrity.

BACKGROUND OF THE INVENTION

A malicious data application, data file or computer program may be harmful to the operating system or other application currently operating on a user's computer. One example of a malicious data application may be a Trojan horse, which is a type of malicious application that appears to be a legitimate application, but contains a malicious payload if executed by an unknowing user on a corresponding user computer device. The payload could be a virus, spyware, rootkit, logic bomb, or any type of malware currently plaguing the computer community.

In general, malicious software is wrapped with a legitimate file to fool the computer users. For example, one might wrap a spyware program to an innocuous file such as a game. There are many methodologies to perform this type of wrapping process. In one example, there are tools such as 'EliteWrap', which will perform the wrapping procedure for a user. Another methodology is actually built into the NTFS file system of Windows® operating systems, which takes advantage of alternate data streams (ADS). An ADS is a methodology within NTFS that allows one to tie a file to another file.

In operation, the user will only see one of the files in Windows Explorer or when listing files from the command line. However, when that file is executed the hidden file will also be executed. This is a well known vulnerability in the security community. Whatever the specific methodology used for tying malicious software to an innocuous program, when the process is complete the resulting program is said to have been 'Trojaned.' Current methods for determining if a given file or executable has been Trojaned are frequently ineffective. The current methods depend solely on looking for signatures of known Trojans or simply if the file has features that might contain a Trojan at all.

The ethical hacker (EC) council sponsors the certified ethical hacker certification test and recommends that if one suspects a given executable is Trojaned, the user should compare a MD5 hash of the executable with the MD5 hash provided on the installation media. This comparison process requires the user to first suspect an executable has been Trojaned, then elect to perform a test of that executable. Also, the installation media must have a hash of the original executable, and the user must have a mechanism for hashing the current executable. This methodology while effective is cumbersome. It also is dependent upon both user knowledge, and upon the vendor of the executable having provided a hash of the executable on the installation media. Furthermore, this methodology is only implemented if and when a user suspects a particular executable has been Trojaned. As a result, Trojaned executables would frequently be missed.

Another well known way to perform software application verifications is with code signing. In this example, the software vendor must sign the code. If it was not signed, then the operating system has no way of verifying the software. With code signing the purpose is to verify that the software being downloaded from the Internet is valid. Once the product is installed, it is not checked at each execution. Code signing is dependent upon third party digital signatures, which may not be present in all instances of installation.

SUMMARY OF THE INVENTION

One embodiment of the present invention may include a method of verifying an application installation procedure. The method may include receiving an application at a computer device and initiating the installation of the application on the computer device. The method may also include executing the application during the installation procedure and creating a hash value corresponding to the executed application data. The method may further include storing the hash value in memory and comparing the hash value to a pre-stored hash value to determine whether to continue the installation of the application.

Another example embodiment of the present invention is an apparatus configured to verify an application installation procedure. The apparatus may include a receiver configured to receive an application and a processor configured to initiate the installation of the application, execute the application during the installation procedure, and create a hash value corresponding to the executed application data. The apparatus also includes a memory configured to store the hash value. The processor is further configured to compare the hash value to a pre-stored hash value to determine whether to continue the installation of the application.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as, packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Figure 1:
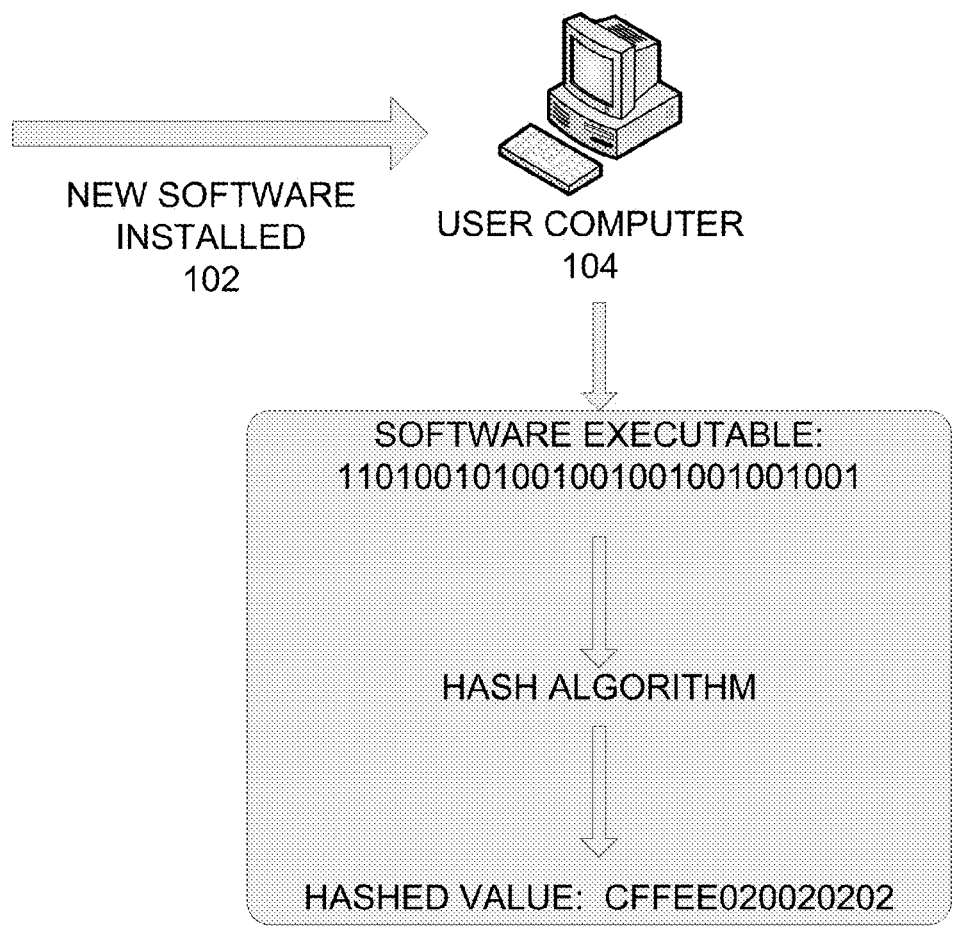
FIG. 1 illustrates an example software installation procedure including a hash computing operation, according to example embodiments of the present invention.

FIG. 1 illustrates an example computer configuration according to example embodiments. Referring to FIG. 1, a user computer 104 is illustrated as being in communication with the Internet, a remote server, etc. to accept and receive software application updates via downloads. The user computer may be a tablet computing device, smartphone device, cellular enabled device, laptop, personal computer (PC) or similar computing device.

FIG. 1 illustrates a process of creating a hashed executable or related data files and/or programs. A user computer 104 may receive a new software install command or batch file procedure from a remote location. The user computer may automatically accept the download and begin installing the new software via the received packet data from the remote source. Alternatively, the user may be prompted to accept or deny the software download and/or install from the remote source. The downloaded software executable may be processed via the user computer 104 and applied to a predetermined hash algorithm, which in turn, produces a hash coded value of the received software executable. The hash of each executable would then be stored in a secure location. The created hash value may be compared to a hash value that is provided with the installation application and/or a hash value pre-stored at a remote location.

Figure 2:
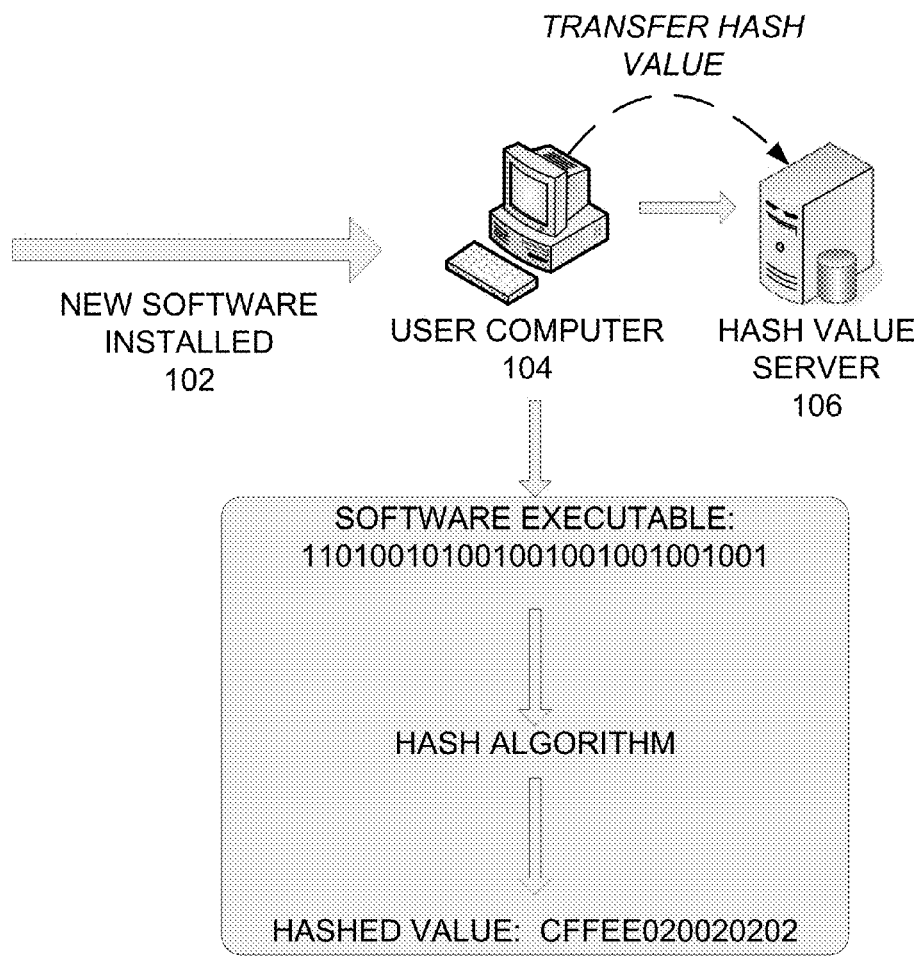
FIG. 2 illustrates an example software installation procedure including a hash computing operation and hash server communication, according to an example embodiment of the present invention.

FIG. 2 illustrates a process of creating a hashed executable or related data files and/or programs and sharing the hashed data with a server, according to example embodiments of the present invention. Referring to FIG. 2, a secure server 106 on the organizational network may be known as a hash value server. In this example, executable hashes would be stored in a manner similar to the way digital certificates are stored. The procedure used to receive and install a software application may be fully automated and transparent to the user. The procedure may not be dependent on the software vendors providing hashes and may be applicable to all executables on a given system, and further applicable to multiple environments (i.e., the user home/individual computer, the organization network computer, etc.).

According to one example, the executable integrity verification procedure used may provide that each new program installed on the system would have a hash value computed and stored. In most operating systems, including Windows®, only administrators can install software. As a result, the process of receiving and updating a software install may also be tied to administrative privileges. As noted above, the procedure used to compute a hash upon installation of the software is illustrated in FIG. 1.

In FIG. 2, when any executable was launched on the user computer 104, a query would be issued to the hash value server 106, which sends that server the hash value of the current executable. The hash value server 106 would then compare that recently created hash value to a pre-stored hash value. If the hash values matched, then the hash value server 106 would respond by authorizing the requesting user computer 104 to execute the application. If the hash values did not match then the server would respond with a warning to the requesting computer that the application integrity was compromised and that further installation should be aborted.

Upon installation of the application, the executable and any corresponding dynamic link libraries (DLLs) will be hashed. A hash value may be computed for any program, data file or even an entire drive. The application data may change during program use. Trojan horses may affect the executable or the DLLs associated with the application. The executable should be installed prior to performing a hashing operation. For example, on installation disks, the files are compressed so hashing prior to installation would not suffice as the files after installation would be different. Therefore, after installation the executable and other DLLs will be hashed.

Once the program or installation is installed on a computer, a hash is calculated at that point in time. That calculated hash may be used to compare to the originally installed program to ensure no Trojan horse has since been attached to alter the installed program or that the executable has not been changed by malware or other malicious software attacks. Ideally, every time the executable is launched it will be hashed and checked. The hashing procedure takes a few seconds to process with modern processing speeds. In less sensitive environments the hashes may be calculated every so often (i.e., once a day) similar to a virus scan.

Figure 3:
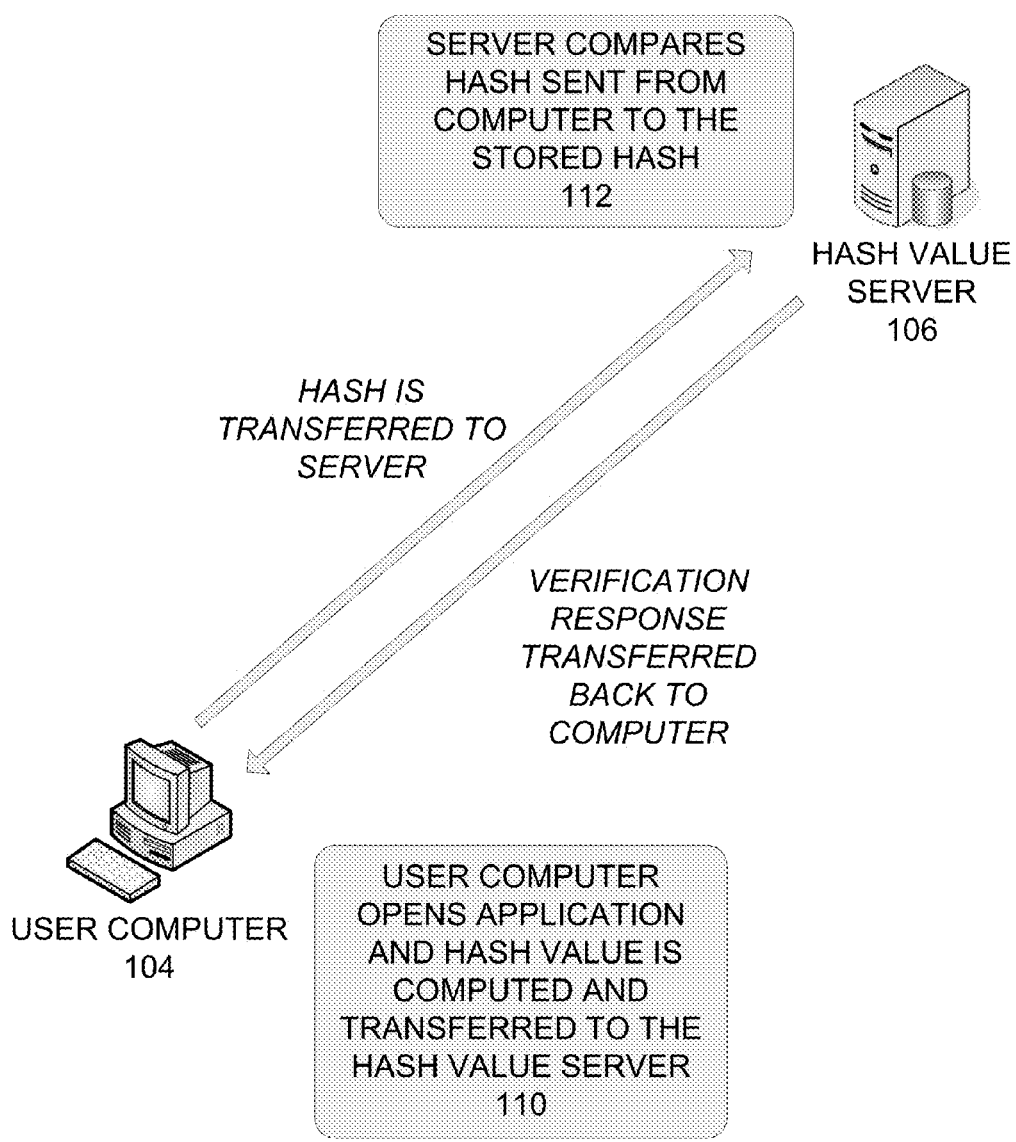
FIG. 3 illustrates a detailed example software installation procedure including a hash computing operation and hash server communication, according to an example embodiment of the present invention.

The verification procedure is illustrated in the client/server communication example of FIG. 3. Referring to FIG. 3, a hash verification procedure is illustrated as having a series of operations used to ensure the application installation and corresponding hashing operations are performed correctly. The user computer 104 may begin by opening a software program or application. During the application opening/executing procedure a hash value is computed based on the contents of the application and transferred to the hash value server 110. The hash value may be wholly or partially based on the digital data contents of the application.

Once the hash value is calculated it is transferred from the user computer 104 to the hash value server 106 via a network communication link. The hash value server 106 may compare the received hash value to a previously stored hash value 112. The comparison may yield a match or a non-match. If the hash values match, a verification message is transferred to the user computer 104 indicating that the software application may be executed and installed for use on the user computer 104. If the hash values do not match, a warning or stop installation message is sent to the user computer 104 to abort the application installation to prevent any malicious code from being installed on the user machine.

In cases where no matching hash value was found on the hash value server 106, the server could either respond denying the program permission to run or in another example, warn the user that the integrity of the program could not be verified. The user or user computer 104 could then decide to proceed with the application execution. This warning could be presented to the user in the form of a decision window "Application could not be verified. Do you wish to proceed with this application installation? YES or NO." In the case of an automated approach, the application installation may automatically be revoked from further installation.

The hash value server 106, would be effective in an organizational network setting but not as effective in a home setting or any situation in which an individual computer was operating independent of a network. According to another example, immediately following the installation of any new executable on the user computer 104, a hash would be calculated for that executable. That hash could be stored in a secure location on the user's computer (rather than on a hash value server), such as a system folder only accessible to users with administrator/root privileges.

Figure 4A:
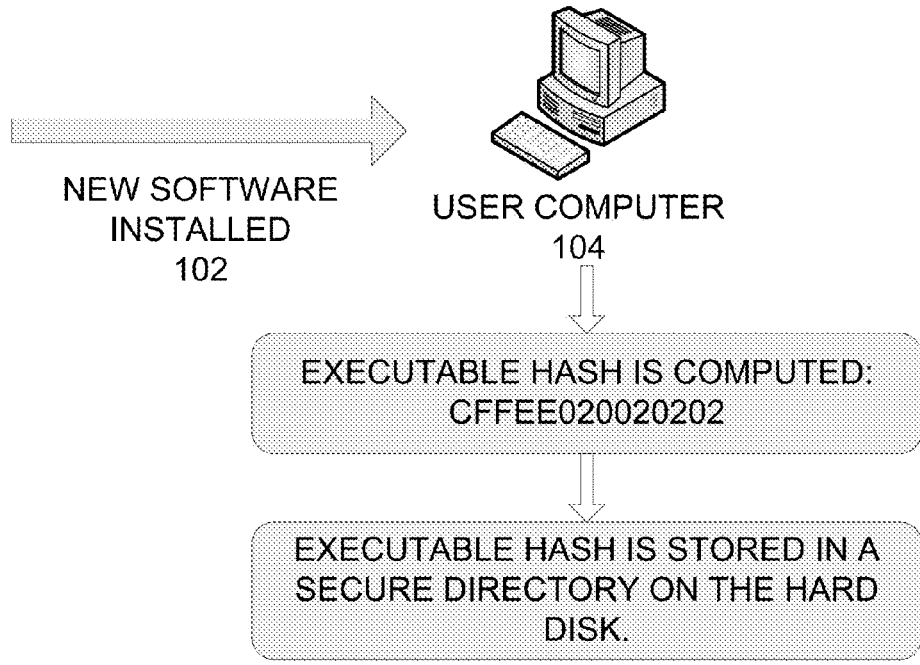
FIG. 4A illustrates an example software installation procedure including a hash computing operation and local storage procedure, according to an example embodiment of the present invention.

FIG. 4A illustrates an example of performing a local secure storage of the computed hash value. Referring to FIG. 4, once the hash value is computed, the user computer 104 proceeds to store the hash value in a secure folder or directory locally on the user computer 104. In yet another example, the hash values stored on the user computer 104 would be encrypted.

Figure 4B:
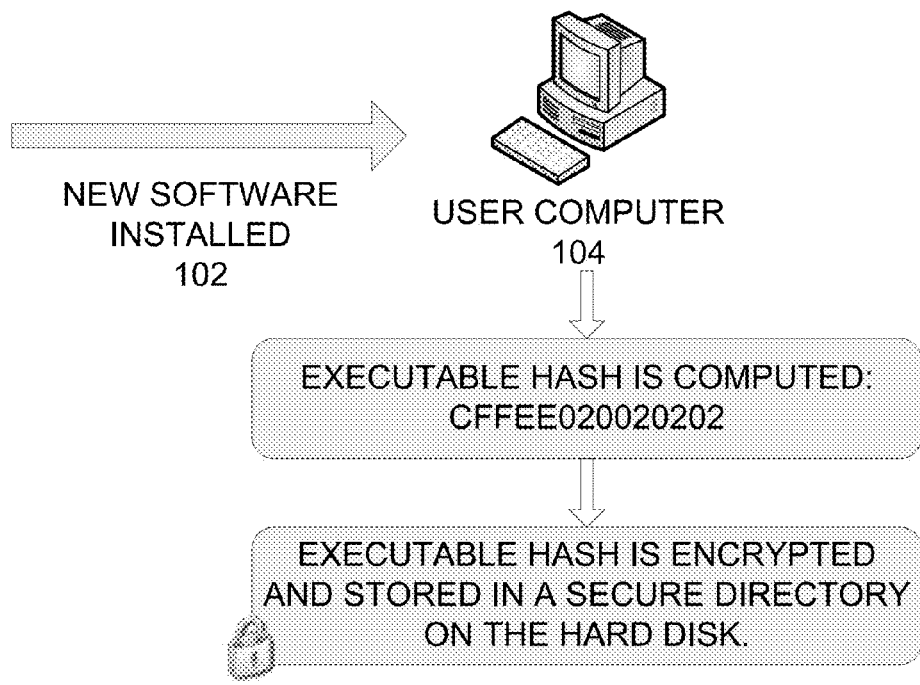
FIG. 4B illustrates an example software installation procedure including an encrypted hash computing operation and local storage procedure, according to an example embodiment of the present invention.

FIG. 4B illustrates the process of encrypting the computed hash value and storing it in a secure directory of the hard disk. If the hash values are stored locally and are not encrypted, then there is the possibility of an attacker 'trojaning' an executable then putting that trojaned executables hash into the hash value repository. In another example, after installing a new program the hash for that program would be calculated and the user would be prompted to insert some removable media (e.g., CD, DVD, USB memory device, etc.) to store the hash value. Applications could only be executed when the removable media was present so that the hash values could be compared.

None of the above-noted hashing examples are limited to a specific hashing algorithm. The hashing algorithm may include a secure hashing algorithm (SHA) SHA-1 and SHA1, a message digest algorithm (MDx) MD4 and MD5 or any hashing algorithm. The purpose of the hash is simply to verify the integrity of the target application.

Example embodiments provide executable integrity verification each time software is executed, it is checked for validity. This specifically will prevent techniques like using alternate data streams that attach other files to existing files. Code signing cannot provide protection from such installation procedures. According to other example embodiments executable integrity verification may be used to have the operating system creates its own hash for each executable at installation time. As a result, there is no reliance on third parties, nor even a need to be connected to the internet. By performing a hash comparison each time a program is executed, the integrity can be guaranteed for each use and not just an initial installation effort.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 5 illustrates an example network element 500, which may represent any of the above-described network components of FIGS. 1-4.

Figure 5:
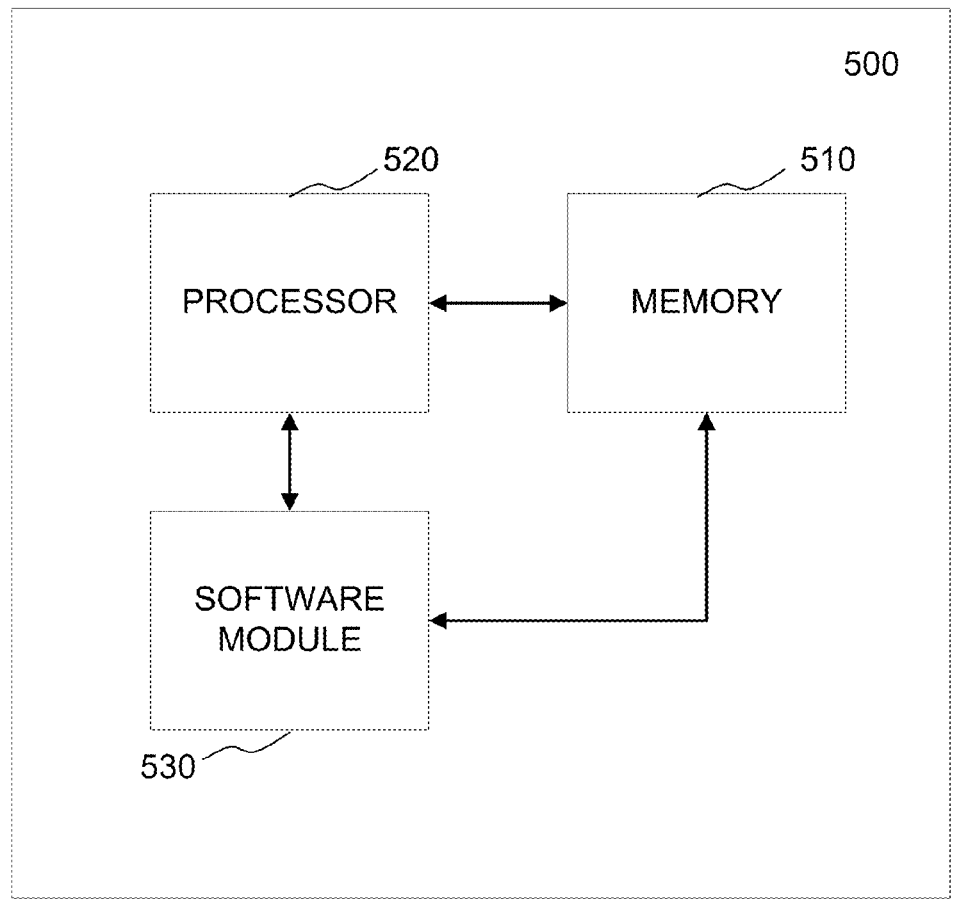
FIG. 5 illustrates an example network entity device configured to store instructions, software, and corresponding hardware for executing the same, according to example embodiments of the present invention.

As illustrated in FIG. 5, a memory 510 and a processor 520 may be discrete components of the network entity 500 that are used to execute an application or set of operations. The application may be coded in software in a computer language understood by the processor 520, and stored in a computer readable medium, such as, the memory 510. The computer readable medium may be a non-transitory computer readable medium that includes tangible hardware components in addition to software stored in memory. Furthermore, a software module 530 may be another discrete entity that is part of the network entity 500, and which contains software instructions that may be executed by the processor 520. In addition to the above noted components of the network entity 500, the network entity 500 may also have a transmitter and receiver pair configured to receive and transmit communication signals (not shown).

Figure 6:
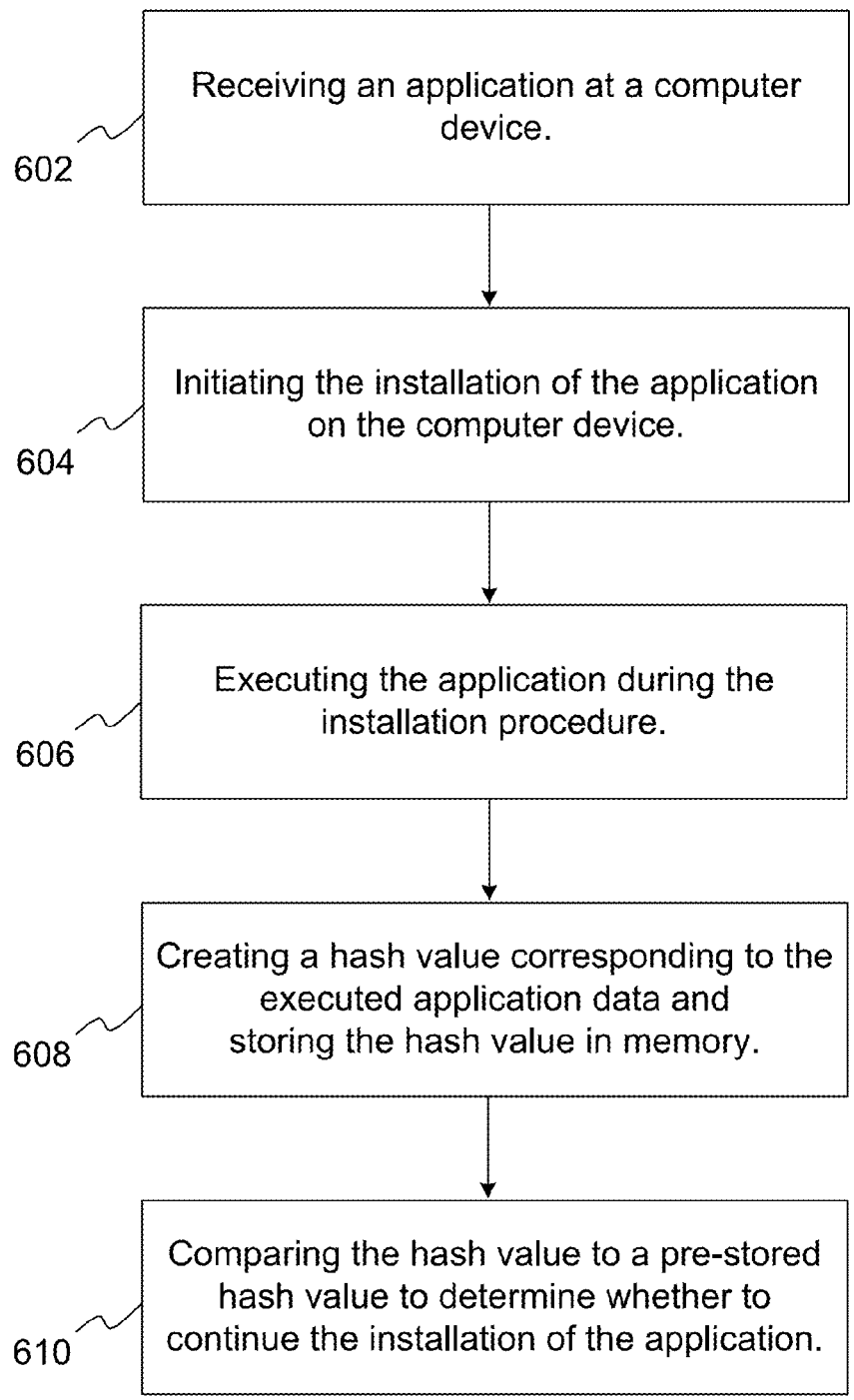
FIG. 6 illustrates a flow diagram of an example method of operation, according to example embodiments of the present invention.

FIG. 6 illustrates an example method of operation. Referring to FIG. 6, a method of verifying an application installation procedure is provided. The method may include receiving an application at a computer device at operation 602, and initiating the installation of the application on the computer device at operation 604. The method may also include executing the application during the installation procedure at operation 606. At this point in the installation procedure, the hash value may be created prior to the application being installed in its entirety. This may prevent harmful applications from effecting system performance since the final installation procedure has not yet been verified or performed. The method may further include creating a hash value corresponding to the executed application data and storing the hash value in memory at operation 608. The method may further include comparing the hash value to a pre-stored hash value to determine whether to continue the installation of the application at operation 610.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method of verifying an application installation procedure, the method comprising:
   receiving an application at a computer device;
   decompressing the application to one or more executables and one or more libraries;
   storing the one or more executables and one or more libraries at the computer device;

initiating the installation of the application on the computer device;

hashing the one or more executable files and one or more libraries to create one or more hash values;

transmitting the one or more hash values;

storing the one or more hash values in memory at a remote location;

transmitting a query to the memory at the remote location to verify the one or more hash values of the one or more executable files;

rehashing the one or more executables and one or more libraries each time the one or more executables are executed to create one or more rehash values;

comparing the one or more rehash values with the one or more stored hashed values; and determining whether to continue with an execution of the one or more executables based on the comparison.

2. The method of claim 1, wherein the comparing the hash value to a pre-stored hash value further comprises comparing the hash value to a pre-stored hash value included with the application data.

3. The method of claim 1, wherein storing the one or more hash values in memory optionally comprises storing the one or more hash values locally on the computer device.

4. The method of claim 1, further comprising:
ending the installation of the application on the computer device if the created hash value does not match the pre-stored hash value.

5. The method of claim 1, further comprising:
continuing the installation of the application on the computer device if the created hash value does match the pre-stored hash value.

6. An apparatus configured to verify an application installation procedure, the apparatus comprising:
a receiver configured to receive an application;
a processor configured to:
  decompress the application to one or more executables and one or more libraries;
  store the one or more executables and one or more libraries at the computer device;
  initiate the installation of the application;
  hash the one or more executable files and one or more libraries to create one or more hash values of the one or more executable files and one or more libraries of the application;
  transmit the one or more hash values; and
a memory, at a remote location, configured to store the one or more hash values; and
wherein the processor is further configured to:
  transmit a query to the memory at the remote location to verify the one or more hash values of the one or more executable files;
  rehash the one or more executables and one or more libraries each time the one or more executables are executed to create one or more rehash values;
  compare the one or more rehash values with the one or more stored hashed values; and
  determine whether to continue with an execution of the one or more executables based on the comparison.

7. The apparatus of claim 6, wherein the processor being configured to compare the hash value to a pre-stored hash value further comprises comparing the hash value to a pre-stored hash value included with the application data.

8. The apparatus of claim 6, wherein the hash value is optionally stored locally.

9. The apparatus of claim 6, wherein the processor is further configured to end the installation of the application if the created hash value does not match the pre-stored hash value.

10. The apparatus of claim 6, wherein the processor is further configured to continue the installation of the application if the created hash value does match the pre-stored hash value.

11. A non-transitory computer readable storage medium configured to store instructions that when executed causes a processor to perform verifying an application installation procedure, the processor being further configured to perform:
receiving an application at a computer device;
decompressing the application to one or more executables and one or more libraries;
storing the one or more executables and one or more libraries at the computer device;
initiating the installation of the application on the computer device;
hashing the one or more executable files and one or more libraries to create one or more hash values;
transmitting the one or more hash values;
storing the one or more hash values in memory at a remote location;
transmitting a query to the memory at the remote location to verify the one or more hash values of the one or more executable files;
rehashing the one or more executables and one or more libraries each time the one or more executables are executed to create one or more rehash values;
comparing the one or more rehash values with the one or more stored hashed values; and
determining whether to continue with an execution of the one or more executables based on the comparison.

12. The non-transitory computer readable storage medium of claim 11, wherein the comparing the hash value to a pre-stored hash value further comprises comparing the hash value to a pre-stored hash value included with the application data.

13. The non-transitory computer readable storage medium of claim 11, wherein storing the one or more hash values in memory optionally comprises storing the one or more hash values locally on the computer device.

14. The non-transitory computer readable storage medium of claim 11, wherein the processor is further configured to perform:
ending the installation of the application on the computer device if the created hash value does not match the pre-stored hash value; and
continuing the installation of the application on the computer device if the created hash value does match the pre-stored hash value.

* * * * *